Patented May 30, 1939

2,160,223

UNITED STATES PATENT OFFICE 2,160,223

MANUFACTURE OF ALIPHATIC KETONE-DIARYLAMINE ANTIOXIDANTS

Ludwig Meuser, Naugatuck, and Charles S. Dewey, Cheshire, Conn., assignors, by mesne assignments, to United States Rubber Company, New York, N. Y., a corporation of New Jersey No Drawing. Application December 9, 1937, Serial No. 178,928

14 Claims. (Cl. 260—566)

This invention relates to an improvement in the manufacture of aliphatic ketone-diarylamine antioxidants, and more particularly fluid condensation products thereof having improved antioxidant characteristics.

It is known that the properties, physical and chemical, of this class of antioxidants, are more or less dependent on the mode of preparation, since the products are composite complex bodies of varying constitution and proportion of ingredients. By this invention the constitution is altered by providing bodies less basic in nature.

According to the present invention a fluid condensation product is prepared by reacting an aliphatic ketone with a diarylamine in the presence of a condensation or dehydration catalyst and in addition in the presence of a substantial amount of a non-basic reducing agent, that is, an agent capable of generating or liberating active or nascent hydrogen at the temperatures used, which are generally in excess of 200° C.

The resulting products are pitchy or tarry liquids having a lower proportion of unreacted amine and a much higher proportion of distillable reaction products, compared with material prepared in the absence of the reducing agent. Furthermore a higher proportion of the ketone is consumed. The resulting products are also obtained in higher yield, containing lower proportions of nitrogen than do the analogous products prepared in the absence of the reducing agent.

Any non-basic reducing agent capable of furnishing hydrogen for combination during the reaction may be employed, among them being formic acid and the hydro-naphthalenes, for example tetralin, decalin, etc., and even including gaseous hydrogen per se. The best results, however, for some reason, are obtained with tetralin using from about 1 to about 2 parts per one part of amine.

The following examples are given in illustration of the invention, the parts being by weight:

Example 1.—100 parts of diphenylamine, 70 parts acetone, 200 parts tetralin, are heated with about 0.61 parts of ferrous iodide for about 15 hours at 250° C. under pressure. The crude reaction product is freed from acidic material by extraction with sodium hydroxide or equivalent alkali, and when freed from solvent (acetone) by heating under vacuum, yields 144 parts of a tarry product. The product may be used as such or freed of excess starting reagent such as diphenylamine. About 120 parts of the tarry product is distillable and the distillable product which contains about 31 parts of diphenylamine may also, if desired, be used as such or freed of diphenylamine before use as an antioxidant.

In place of the 0.61 part of ferrous iodide, there may be used 0.5 part of iodine, or equivalent quantities of other halogens, or of halogen acids, or of their hydrolyzable salts.

Example 2.—100 parts of diphenylamine, 80 parts of acetone, 0.5 part iodine, and 33.5 parts of 87 percent formic acid are heated under pressure for 11 hrs. at 250° C. A solvent-free neutralized fluid product is obtained in a manner as set forth in Example 1, the yield in this instance being 145 parts. This product may also be used as such, or the distillable portion may be used, if desired, as an antioxidant, preferably when freed of diphenylamine by distillation.

The reaction is preferably carried out in an autoclave or other corrosion-resisting equipment designed to withstand the pressures used, which is about 400–600 pounds per square inch at 250° C., and varies somewhat with the temperature employed and the size of the batch and the autoclave. Any of the known catalysts for condensing aliphatic ketones and diarylamines may be employed, particularly those set forth in U. S. P. 1,807,355, and U. S. P. 1,975,167. The reducing agent should be employed in an amount of at least 10% by weight based on the weight of the diarylamine employed. The temperature may range from 220° C. to 280° C., although temperatures in the range of about 240° C. to about 260° C. are preferred.

The reaction may be carried out with other aliphatic ketones, for example, ethyl methyl ketone, diethyl ketone, mesityl oxide, phorone, dimethyl ketone, dipropyl ketone, dibutyl ketone, etc. and in place of diphenylamine, for reacting with any of the ketones, other diarylamines may be employed, for example, phenyl beta-naphthylamine, N,N'-diphenyl p-phenylene diamine, ditolylamine dixylamine, phenyl tolylamine, dinaphthylamine, phenyl alpha-naphthylamine, etc. In general, for every molecular proportion of the diarylamine there should be used at least 1.5 molecular proportions of the aliphatic ketone, and preferably 2 to 3 molecular proportions of the ketone.

The composite products may be employed for preserving and protecting rubber, unvulcanized or vulcanized, and similar oxidizable materials which tend to deteriorate by absorption of oxygen from the air, for example, goods of rubber or allied gums, unsaturated fatty oils such as unsaturated vegetable oils, essential oils, petroleum oils and their derivatives including cracked gasolines, soaps, aldehydes, synthetic resins, and the like,—by incorporation of amounts ranging from 0.1% to 5% by weight. They are particularly useful in retarding the deterioration of vulcanized rubber goods, having good anti-flex cracking properties in articles such as rubber tires which undergo repeated strains during use.

The term "rubber" is used broadly to include caoutchouc, balata, gutta-percha, and similar vulcanizable gums, as well as synthetic rubbers, rubber isomers, reclaimed rubber, etc., and natural or artificially-prepared latices, compounded or not with fillers, accelerators, softeners, etc.

Having thus described our invention, what we claim and desire to protect by Letters Patent is:

1. A method of producing a fluid aliphatic ketone-diarylamine anti-oxidant which comprises reacting at least one molecular proportion of an aliphatic ketone with one molecular proportion of a diarylamine in the presence of both an acidic condensation catalyst and a non-basic reducing agent capable of furnishing hydrogen for combination in the reaction product during the reaction at a temperature of at least 200° C.

2. A method of producing a fluid aliphatic ketone-diarylamine anti-oxidant which comprises reacting at least one and five-tenths molecular proportions of an aliphatic ketone with one molecular proportion of a diarylamine in the presence of both an acidic condensation catalyst and a non-basic reducing agent capable of furnishing hydrogen for combination in the reaction product during the reaction at a temperature of at least 200° C., and subsequently neutralizing the reaction product and removing excess starting material.

3. A method of producing a fluid aliphatic ketone-diarylamine anti-oxidant which comprises reacting at least two molecular proportions of an aliphatic ketone with one molecular proportion of a diarylamine in the presence of both an acidic condensation catalyst and a non-basic reducing agent capable of furnishing hydrogen for combination in the reaction product during the reaction at a temperature of at least 200° C., and subsequently neutralizing the reaction product and removing excess starting material.

4. A method of producing a fluid aliphatic ketone-diarylamine anti-oxidant which comprises reacting at least three molecular proportions of an aliphatic ketone with one molecular proportion of a diarylamine in the presence of both an acidic condensation catalyst and a non-basic reducing agent capable of furnishing hydrogen for combination in the reaction product during the reaction at a temperature of at least 200° C., and subsequently neutralizing the reaction product and removing excess starting material.

5. A method of producing a fluid acetone-diphenylamine antioxidant which comprises reacting at least one and five-tenths molecular proportions of acetone with one molecular proportion of diphenylamine in the presence of both an acidic condensation catalyst and a non-basic reducing agent capable of furnishing hydrogen for combination in the reaction product during the reaction at a temperature of at least 200° C.

6. A method of producing a fluid aliphatic ketone diarylamine anti-oxidant which comprises reacting at least one and five-tenths molecular proportions of an aliphatic ketone with one molecular proportion of a diarylamine in the presence of both an acidic condensation catalyst and a hydro-naphthalene at a temperature in the range of about 240° C. to about 260° C.

7. A method of producing a fluid aliphatic ketone diarylamine anti-oxidant which comprises reacting at least one and five-tenths molecular proportions of an aliphatic ketone with one molecular proportion of a diarylamine in the presence of both an acidic condensation catalyst and tetralin at a temperature in the range of about 240° C. to about 260° C.

8. A method of producing a fluid aliphatic ketone diarylamine anti-oxidant which comprises reacting at least one and five-tenths molecular proportions of an aliphatic ketone with one molecular proportion of a diarylamine in the presence of both an acidic condensation catalyst and formic acid at a temperature in the range of about 240° C. to about 260° C.

9. A hydrogenated aliphatic ketone-diarylamine anti-oxidant resulting from a process as set forth in claim 1.

10. A hydrogenated acetone-diphenylamine anti-oxidant resulting from the process set forth in claim 5.

11. A hydrogenated aliphatic ketone diarylamine anti-oxidant resulting from the process set forth in claim 6.

12. A hydrogenated aliphatic ketone diarylamine anti-oxidant resulting from the process set forth in claim 7.

13. A hydrogenated aliphatic ketone diarylamine anti-oxidant resulting from the process set forth in claim 8.

14. A method which comprises condensing an aliphatic ketone with a diarylamine in the presence of a hydronaphthalene while heating to a temperature at which the hydronaphthalene liberates active hydrogen for combination with the condensation product.

LUDWIG MEUSER.
CHARLES S. DEWEY.